United States Patent
Gainer

(10) Patent No.: US 7,442,161 B2
(45) Date of Patent: Oct. 28, 2008

(54) POSITION ADJUSTER FOR A DEVICE

(75) Inventor: Robert Gainer, Newberg, OR (US)

(73) Assignee: InFocus Corporation, Wilsonville, OR (US)

( * ) Notice: Subject to any disclaimer, the term of this patent is extended or adjusted under 35 U.S.C. 154(b) by 220 days.

(21) Appl. No.: 10/889,899

(22) Filed: Jul. 8, 2004

(65) Prior Publication Data

US 2006/0006295 A1    Jan. 12, 2006

(51) Int. Cl.
*G03B 21/14* (2006.01)
(52) U.S. Cl. .................. 248/70; 353/119; 248/157; 248/188.8; 248/407
(58) Field of Classification Search .............. 248/188.8, 248/188.2, 188.4, 354.3, 161, 157, 404, 405, 248/406.1, 407
See application file for complete search history.

(56) References Cited

U.S. PATENT DOCUMENTS

| | | | | |
|---|---|---|---|---|
| 5,116,004 | A * | 5/1992 | Luecke | 248/161 |
| 6,302,543 | B1 * | 10/2001 | Arai et al. | 353/70 |
| 6,461,002 | B1 * | 10/2002 | Su | 353/119 |
| 2002/0139909 | A1 * | 10/2002 | Oyama et al. | 248/188.8 |
| 2005/0012000 | A1 * | 1/2005 | Jones | 248/178.1 |
| 2005/0263663 | A1 * | 12/2005 | Inoue | 248/354.1 |

OTHER PUBLICATIONS

Infocus Systems Inc, *LitePro 610/620*, Wilsonville, OR, 1996, p. 26.
"LitePro 610/620 User's Guide." Jun. 1996. In Focus Systems, Inc. Wilsonville, Oregon.

* cited by examiner

*Primary Examiner*—Amy J. Sterling
(74) *Attorney, Agent, or Firm*—Alleman Hall McCoy Russell & Tuttle, LLP

(57) ABSTRACT

A position adjuster for a projection device is provided. The position adjuster may include both a coarse adjustment mechanism and a fine adjustment mechanism for positioning the projection device relative a reference surface.

26 Claims, 4 Drawing Sheets

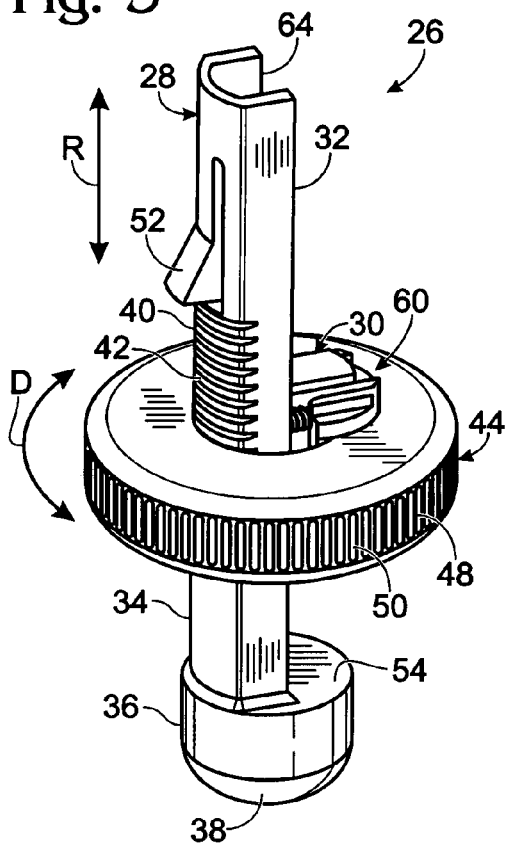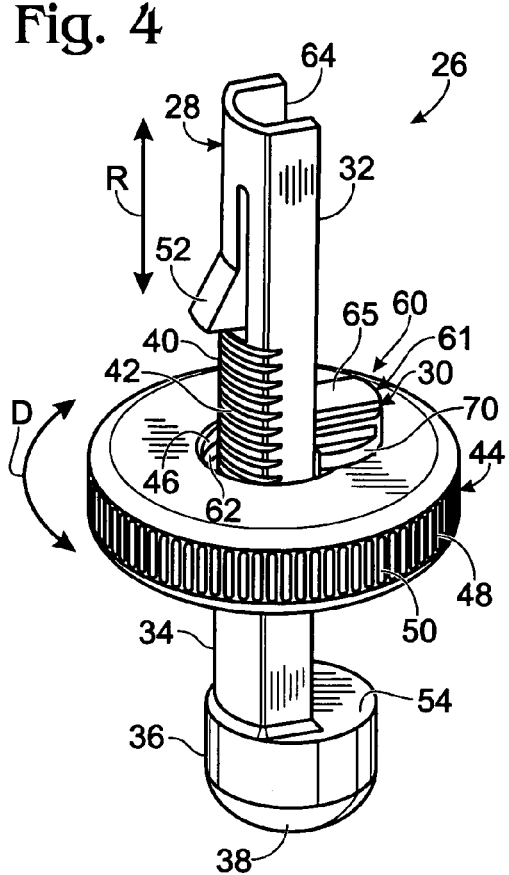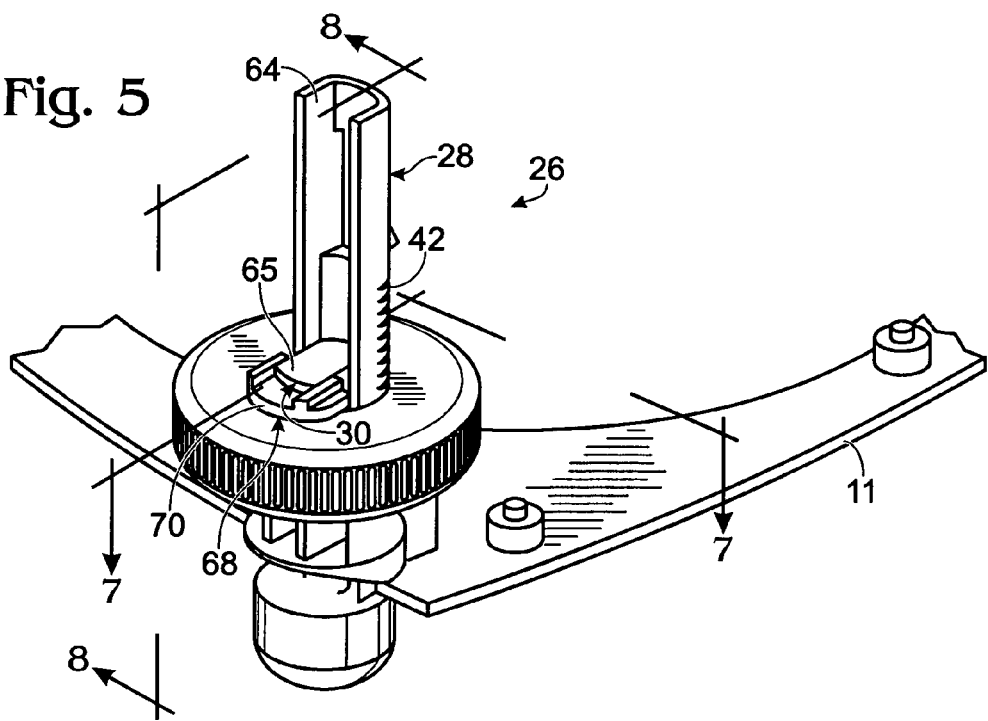

POSITION ADJUSTER FOR A DEVICE

TECHNICAL FIELD

The present disclosure relates generally to position adjustment mechanisms for various devices, including projection devices.

BRIEF DESCRIPTION OF THE DRAWINGS

The disclosure is illustrated by way of example and not by way of limitation in the figures of the accompanying drawings, in which the like references indicate similar elements and in which:

FIG. 3 is a perspective view of an exemplary position adjuster in a first configuration for fine adjustment according to an embodiment of the present disclosure.

FIG. 4 is a perspective view of the position adjuster of FIG. 3, where the position adjuster is in a second configuration for course adjustment according to an embodiment of the present disclosure.

FIG. 5 is a perspective view of the position adjuster of FIG. 3, where the position adjuster is attached to the projection device housing, and is in a first configuration for fine adjustment according to an embodiment of the present disclosure.

DETAILED DESCRIPTION

Figure 1:
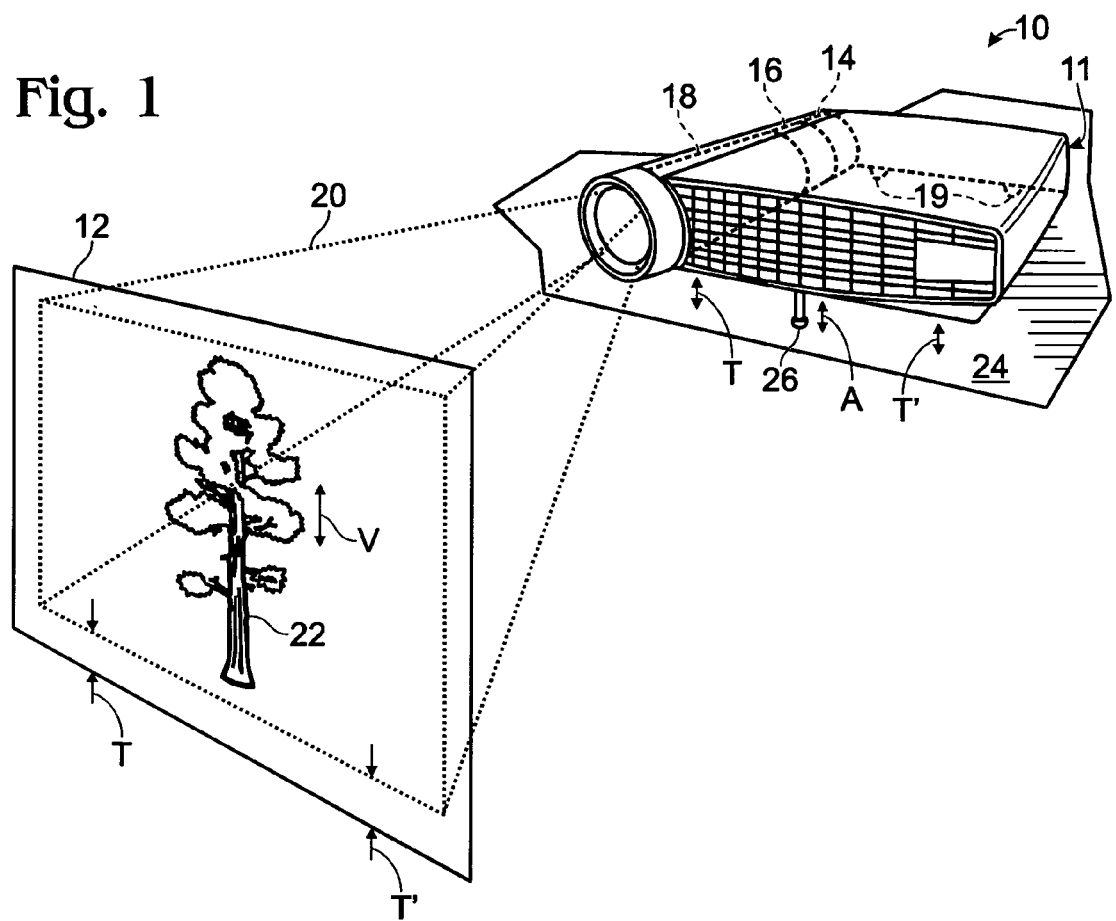
FIG. 1 is a schematic illustration of an exemplary projection device in which a position adjuster of the present disclosure may be implemented.

An exemplary projection device 10 is illustrated in FIG. 1. Projection device 10 may be adapted to project an image on a display or viewing surface 12, including, but not limited to, a screen, a wall, or other viewing surface or area. As used herein, a projection device may include any suitable display device or image projector, including, but not limited to, a digital projector, a liquid crystal display (LCD) projector, a digital light processing projector, a rear projection device, a front projection device, etc.

As shown in FIG. 1, exemplary projection device 10 typically includes a body or housing 11. Contained within housing 11 may be light source 14 and an image-generation device 16. Light source 14 may be adapted to produce a beam of light and project the light towards the image-generation device 16, which may be configured to generate and project an image.

In some embodiments, light source 14 may include a lamp positioned within a reflector that is configured to direct most of the emitted light along an optical path 18 of the system. The light source may include any suitable type of lamp. Examples include, but are not limited to, metal halide lamps and ultra-high-pressure (UHP) arc lamps, lasers, light emitting diodes (LED), etc. The system also may include one or more filters, such as an infrared (IR) or ultraviolet (UV) filter, to filter out unwanted parts of the emission spectra of the lamp.

Image-generation device 16 may be configured to receive the light from light source 14 and generate an image to be projected. The image-generation device may include an optical engine, image-producing element, filters, color wheels, lenses, mirrors, integrators, condensers, and other suitable optical elements. Such elements may be configured to generate an image. For example, the image generation device may include an image-producing element, such as, but not limited to, a digital micromirror (DMD), an LCD panel, or any other suitable image source. In some embodiments, the image-producing element may be configured to project light toward one or more lenses, mirrors or other optics, which, in turn, may be configured to project light toward display or viewing surface 12. Thus, projection device 10 is configured to generate and project (as indicated at 20) an image 22 on display surface 12.

In some embodiments, projection device 10 may be configured to be positioned on a reference surface, such as support surface 24. Support surface 24 may be any suitable surface adapted to support a projection device. For example, support surface 24 may be a table, a ledge, a chair, a shelf, etc. Projection device 10 may be positioned on support surface 24 such that the projected image 22 is directed to a selected display surface 12.

Housing 11 may be configured to house the varied components of the projection device 10, and to stabilize the device on a support surface. Housing 11 may include one or more stabilizing protrusions 19 to assist in the positioning of housing 11 on the support structure. Stabilizing protrusions 19 may assist in evenly distributing the weight of projection device 10. Additionally, the stabilization protrusions may be formed of a material that decreases surface friction so that the projection device may be evenly moved across a support surface with minimal force. Further, the stabilization protrusions may be adapted to accommodate change in the angle of the projection device relative the reference surface. Suitable material may include hard plastics, metals, or a combination thereof.

Stabilizing protrusion 19 may be positioned on the bottom portion of housing 11 where the housing contacts the support surface. The embodiment of FIG. 1 shows two stabilizing projections 19 located on the rear of projection device 10. Other embodiments may include more or less stabilizing projections located on the sides, the rear corners or in any location where stabilization may be required.

In some embodiments, it may be possible to adjust the angle of the projection device 10 relative to reference surface 24. By adjusting the angle of projection device 10 relative to the reference surface (thereby adjusting the angle of projection 20), a user may be able to selectively adjust the vertical position of image 22 on display surface 12. Such adjustment may be used to optimize the position of the image on the display surface. Additionally, it further may be possible to adjust the side-to-side tilt of the projection device to selectively align the image with an edge of the display surface.

Referring back to FIG. 1, projection device 10 may include one or more position adjusters or lifts 26. Position adjuster 26 may enable a user to selectively raise, lower and adjust the tilt of a projection device relative a reference surface as indicated by arrow A. For example, position adjuster 26 may be configured to adjust the angle of the projection device relative to a reference surface 24. Such adjustment capabilities may enable a user to selectively position image 22 on display surface 12. For example, a user may be able to change the vertical position of the projected image on the display surface as indicated by arrow V (vertical adjustment of image).

Moreover, in some embodiments, the position adjuster may be configured to adjust the side-to-side tilt of the projection device, thus enabling a user to selectively position the tilt of the image, as indicated by arrows T and T'. A user may selectively raise a first edge of the image, as indicated at T, and then match the second edge, as indicated at T', such that the bottom of the image is horizontal or in line with the edge of display surface 12. Thus, using the position adjuster, a user may selectively position an image at a desired location on the display surface.

It should be appreciated that position adjuster 26 as described herein may be used in a variety of devices where selective tilt adjustment may be desired. For example, the position adjuster disclosed herein may be integrated or incorporated with any suitable position-sensitive device, including, but not limited to, electronic devices, such as projection devices, monitors, computers, audio devices, etc. The position adjuster may also be used with furniture or other articles which may be selectively positioned at an angle from a reference surface.

Position adjuster 26 may engage both the support surface 24 and the body or housing 11 of projection device 10. Position adjuster 26 may be adapted to support the projection device and maintain the projection device at select positions. For example, position adjuster 26 may enable a user to selectively position the front edge of a projection device a select distance from support surface 24. Further, in some embodiments, position adjuster 26 may enable a user to selectively position one side of the projection device a first distance and the second side a second distance such that the angle of the projected image is selectively controlled.

As described in more detail below, position adjuster 26 may include both a course adjustment mechanism and a fine adjustment mechanism. The coarse adjustment mechanism may enable a user to quickly change the angle of the projection device. In other words, the coarse adjustment mechanism may enable a user to quickly change the selected distance of the projection device from the reference surface, thereby quickly changing the vertical position of the image on display surface 12.

The fine adjustment mechanism may be used to finely position the image on the display surface, thus making small incremental changes in the vertical position of the projected image on the display surface. The combination of coarse and fine adjustment mechanisms may enable a user to easily and rapidly position the image is a select position on the display surface. In the illustrated embodiment, coarse positioning may enable a user to quickly position the device such that the projected image is in an approximate selected vertical position on the display surface. Further, fine positioning may enable a user to accurately position the projected image to a select or precise vertical position on the viewing surface.

It should be appreciated that in some embodiments, a single position adjuster 26 (as shown in FIG. 1) may be disposed on the front portion of the projection device. For example, a single position adjuster 26 may be disposed in a central, front portion of the projection device. The front portion may extend along a front edge of the projection device or may be interior of the front edge.

Figure 2:
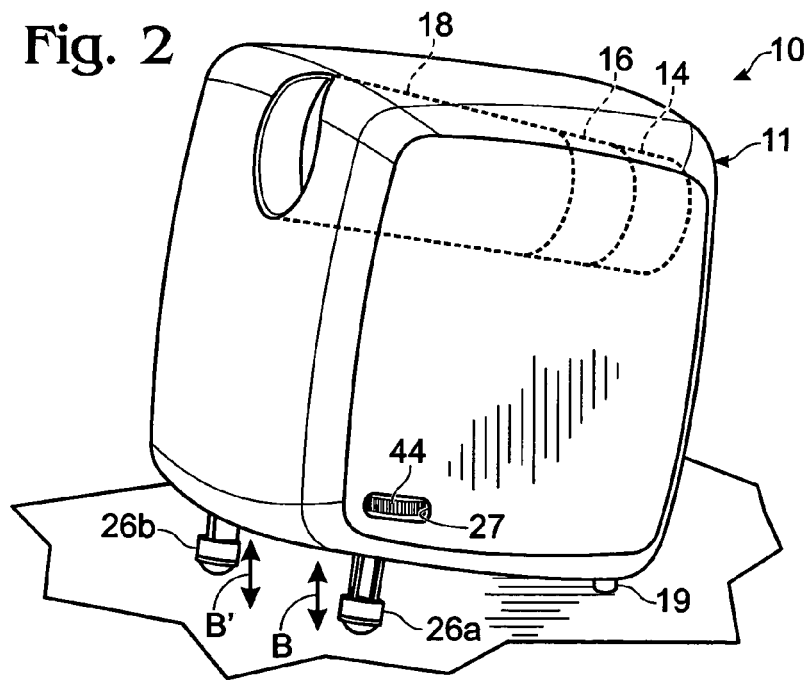
FIG. 2 is a schematic illustration of an alternative exemplary projection device in which position adjusters of the present disclosure may be implemented

In other embodiments, the position adjuster may include two or more position adjusters (such as the example shown in FIG. 2). These position adjusters may be located at the front corners or along the front edge or portion of the projection device, or may further be arranged so that a first position adjuster may be disposed on a first front side of the device and a second position adjuster may be disposed on the opposite front side of the device. In even other embodiments, position adjusters may be disposed in both the front portion and the rear portion of the device.

As briefly described above, FIG. 2 illustrates an embodiment including a first position adjuster 26a, that may be disposed on a first front corner of the device, and a second position adjuster 26b, that may be disposed on a second front corner of a device. Position adjusters 26a and 26b may be incorporated into the housing 11. Housing 11 may be adapted to enable a user to access portions of one or more of the incorporated position adjusters, including a gap or cut-out 27. A user-manipulable adjustment device coupled to the position adjuster may be accessible through cut out 27. For example, a user may access an adjustment dial 44 (described in more detail below) of the position adjuster through cut-out 27. Although shown as a dial, it should be appreciated that other user manipulable adjustment devices may be used to operate the position adjuster, including, but not limited to, push buttons, springs or infrared remote sensors.

The arrangements of a pair of position adjusters 26a and 26b may enable a user to selectively raise, lower and adjust the tilt of projection device 10 relative to reference surface indicted by arrows B and B' respectively. As position adjusters 26a and 26b are positioned on opposite sides of the projection device, a user may manipulate one or both 26a and 26b to more precisely adjust the angle and tilt of the projected image. Through the use of both position adjusters, a user may selectively adjust the projection device relative to the support surface, and thus, position the image into a select position on the display surface.

As described above, one or more stabilizing projections 19 may be disposed on or near the rear portion of the projection device (two stabilizing projections are shown in FIG. 1 and a single stabilizing projection is indicated in FIG. 2). The rear-stabilizing projections may enable the rear portion of the projection device to slide on the support surface in response to the raising or lowering of the front portion caused by the front position adjuster. In some embodiments, the rear-stabilizing projection may be adapted to grip or retain the support surface, such that the position adjusters slide slightly in response to raising and/or lowering the device.

Referring now to FIG. 3, an exemplary position adjuster is illustrated at 26. As described above, position adjuster 26 may be configured to support a portion of the projection device. A portion of position adjuster 26 may be contained within the body or housing 11 of projection device 10. For example, position adjuster 26 may include an adjustment rod or alignment rod 28. Adjacent to adjustment rod 28 may be an attachment structure 30 to which the housing of the projection device may be fixed or attached. Attachment structure 30 may be integrated within the body or housing of projection device 10.

As described in more detail below, attachment structure 30 may be adapted to couple the position adjuster to the housing. In some embodiments, attachment structure may be considered to include a first plate and a second plate linked through a rib (described in more detail below). The rib may be positioned on the inside of adjustment rod 28.

Interposed between the first plate and second plate of attachment structure 30 may be an adjustment dial 44 that may be configured to move rotationally around an axis defined by adjustment rod 28 as indicated by arrow D. Rotational movement of adjustment dial 44 may allow fine positioning of the device relative a support surface such that rotational movement causes adjustment rod 28 to move vertically relative to that adjustment dial and vertically relative the attachment structure 30 attached to both the adjustment dial and to the device 10. Such motion is indicated by arrow R. Thus, it should be appreciated, that attachment structure 30 (and thus the device) move in response to the rotation of adjustment dial 44. In this sense, the device is operatively coupled to adjustment dial 44.

In the illustrated embodiment, the upper portion 32 of adjustment rod 28 may be contained within the housing of the projection device. For example, in some embodiments, an aperture may be provided within the housing of projection device 10 into which the upper portion 32 of adjustment rod 28 may travel. In some embodiments, the housing may be configured to prevent substantial lateral motion of rod 28.

The lower portion 34 of adjustment rod 28 may be configured to engage the support or reference surface (e.g., support surface 24 in FIG. 1) upon which the projection device is disposed. Lower portion 34 may include a foot 36, such as a ball-shaped foot as illustrated in FIG. 2. However, any suitable foot 36 may be used without departing from the scope of the disclosure. In some embodiments, the foot may include a contact region 38 which may be configured to engage the support surface. The contact region may include features to prevent slippage of the foot on the support surface.

In some embodiments, foot 36 may be composed of a first and second material. For example, foot 36 may include a first material which may be a hard, rigid support material, e.g., hard plastic Foot 36 may further include a second material, such as an increased friction material, e.g. rubber, soft plastic, etc.

Adjustment rod 28 further may include position-locking features along a portion of the rod. For example, adjustment rod 28 may include a threaded portion 40 with threads 42. Although shown as having only a middle portion of adjustment rod with threads 42, it should be appreciated that in some embodiments the entire rod may be threaded. Alternatively, in other embodiments, various regions may be threaded. Moreover, it should be appreciated that other types of position-locking features, such as detents, sockets, or positioning holes, etc. may be used without departing from the scope of the disclosure.

Threads 42 may match with corresponding threads (shown at 46 in FIG. 4) of a threaded region of adjustment dial 44. These corresponding threads or internal threads 46 may lock the adjustment dial in a selected position along adjustment rod 28. Since the projection device is operatively coupled to the adjustment dial, vertical movement of rod 28 (which may result from fine or course positioning) effects the position of the projection device relative the reference surface. The projection device may thus be supported in a selected position by the locking of the adjustment dial on the threads of adjustment rod 28. It should be appreciated that any suitable position locking features may be used to maintain the adjustment dial in position relative to the adjustment rod.

Adjustment rod threads 42 and internal adjustment dial threads 46 may be configured to support the weight of projection device when the adjustment dial is in a selected position. Thread thickness and pitch may be modified to accommodate various projection device weights. For example, embodiments used in projection devices of comparatively lighter weight may include adjustment rod and dial threads that are narrower, or thinner, than the threads included on adjustment rods and dials of heavier weight projection devices. Further, the threads may be designed to disengage if the position adjuster is subject to increased force. This may occur if the projection device falls over a vertical distance with the position adjusters extended, for example, if the projection device falls off of a support surface. Upon falling, the lower portion of the adjustment rod may be subject to increased force acting to disengage the threads and move the rod vertically towards the projection device body. In this manner, the position adjusters may absorb some of the force suffered in a fall, and may prevent or diminish damage to the projection device and/or position adjusters. In other words, the collapsing structure (described in detail below) may be configured to automatically collapse upon excessive force.

As described above, adjustment dial 44 may be configured to engage a portion of adjustment rod 28, e.g. the threaded region of adjustment dial 44 may engage the threaded portion of adjustment rod 28. In some embodiments, adjustment dial 44 may be configured to be selectively rotated around adjustment rod 28. For example, adjustment dial 44 may be doughnut or wheel shape with an exterior ring forming an opening into which adjustment rod 28 may extend. Other shapes are possible, including wing shape, partial ring, etc. By rotating adjustment dial 44, it may be possible to alter the position of adjustment dial 44 on adjustment rod 28. Such rotation enables fine adjustment of the position of the projection device relative the support surface.

In some embodiments, adjustment dial 44 may include a gripping portion 48 configured to enable a user to easily grip and rotate adjustment dial 44. For example, in some embodiments, gripping portion 48 may include surface texture, such as ridges 50, which enable a user to grip and rotate adjustment dial 44.

In some embodiments, attachment structure 30 may be configured to span the adjustment dial such that rotation of the adjustment dial does not cause attachment structure 30 (or device 10) to rotate. However, rotational movement, results in adjustment rod 28 moving vertically relative to adjustment dial 44. As the adjustment rod moves vertically, device 10 is affected such that the position of device 10 relative the support surface is altered.

For example, an embodiment implementing right-hand threads is described below. Specifically, in the right-hand threaded embodiment, rotation of adjustment dial 44 in a clockwise direction, as indicated by arrow D, may result in adjustment rod 28 rising upwards relative to adjustment dial 44 such that a smaller portion of adjustment rod 28 extends from the housing of the projection device. Motion of adjustment rod 28 is indicated by arrow R. As the projection device is coupled to the adjustment dial through the attachment structure 30, clockwise rotation of the adjustment dial relative the rod results in a portion of the device being lowered toward the reference surface. Alternatively, rotation of the adjustment dial 44 in a counter-clockwise direction may result in adjustment rod 28 extending outward from adjustment dial 44 such that a larger portion of adjustment rod 28 extends from housing of the projection device. Such counter-clockwise rotation of the adjustment dial results in a portion of the device being raised relative the reference surface. It should be appreciated that in alternative embodiments, the threads may be configured such that clockwise rotation raises the device and counter-clockwise rotation lowers the device. Thus, the threads may be right-hand threads or left-hand threads.

Moreover, in some embodiments where there are two position adjusters, each position adjuster may have the same threads (such as both may be right hand threaded configurations) or alternatively, one position adjuster may have a right-hand configuration while the other position adjuster may have a left-hand threaded configuration.

It should be noted that in some embodiments, adjustment rod 28 may include one or more stops, such as upper stop 52. Stop 52 be configured to prevent rotation of adjustment dial 44 beyond threaded portion 40 of adjustment rod 28. The stop may prevent the adjustment rod from being released from or falling out of the position adjuster. A lower stop may also be provided. For example, in the illustrated embodiment, foot 36 may be sized to prevent rotation of adjustment dial 44 off of adjustment rod 28. Specifically, foot 28 may include a rest or stop 54 which is configured to engage and prevent release of adjustment dial 44 from adjustment rod 28.

Turning now to FIG. 4, position adjuster 26 may provide a coarse adjustment mechanism, as well as, a fine adjustment mechanism such as the rotational mechanism described above. During fine adjustment, adjustment dial 44 may be configured to rotate about adjustment rod 28, such that internal threads 46 of adjustment dial 44 engage the threads 42 of adjustment rod 28. Such rotation results in vertical movement of adjustment rod 28 relative adjustment dial 44, and thus, movement of projection device 10. Some of these same components may be used as part of the coarse adjustment mechanism which generally includes any suitable mechanism and/or components which enable coarse adjustment of the device.

Coarse adjustment mechanism 60 may include a disengagement or collapsing structure 61 adapted to enable release of adjustment rod 28 from adjustment dial 44. For example, in some embodiments, the collapsing structure may enable the adjustment dial to be selectively disengaged from the adjustment rod by releasing the internal threads 46 of adjustment dial 44 from the threads 42 of adjustment rod 28. Upon disengagement, a space 62 may be formed between adjustment dial 44 and adjustment rod 28. Once disengaged from the adjustment dial, the adjustment rod may be selectively positioned. For example, the adjustment rod may be positioned such that first portion extends outwards such that the device is at a select angle. Thus, the adjustment dial may be positioned along a select portion of the adjustment rod between the stops 52, 54. No rotation of the adjustment dial is necessary for the coarse adjustment mechanism since the adjustment dial does not engage the adjustment rod during adjustment.

After selecting a position, the collapsing structure may be released such that the adjustment dial once again engages the adjustment rod. The threads of the adjustment dial 46 lock into the threads of the adjustment rod 42, thus locking the projection device in a desired location. A user may then finely adjust the position by rotating the adjustment dial as described above in relation to FIG. 2.

Figure 6:
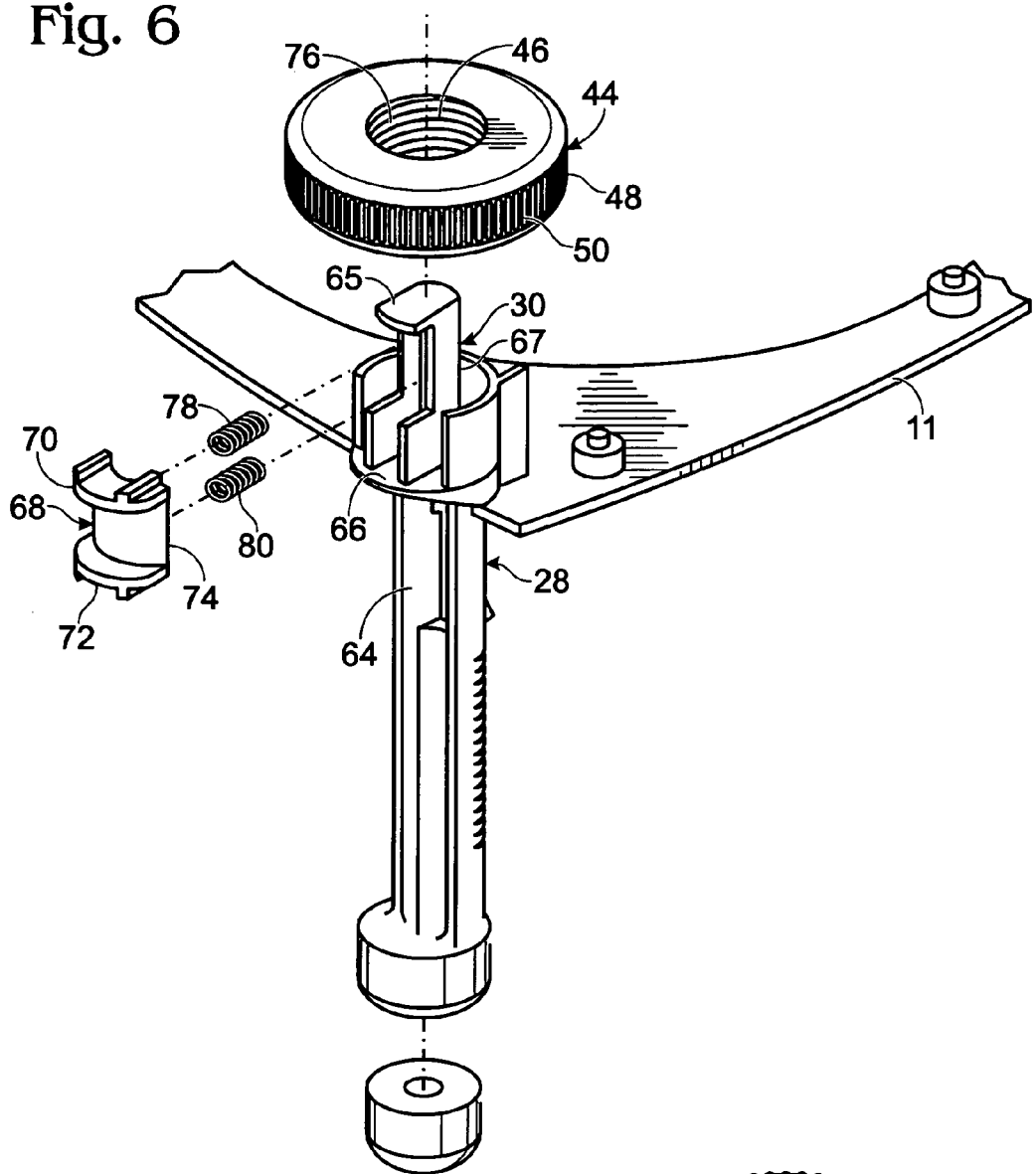
FIG. 6 is an exploded view of the position adjuster of FIG. 5.
Figure 7:
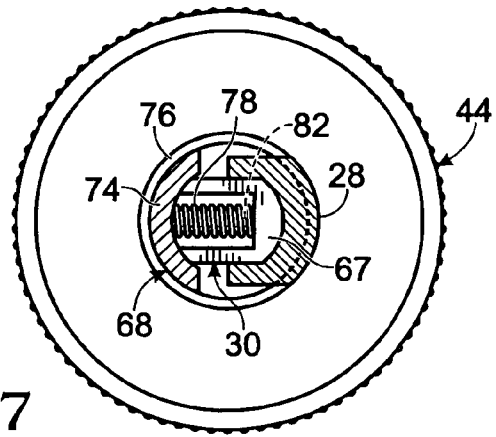
FIG. 7 is a cross-sectional view of the position adjuster of FIG. 5 along line 7-7 of FIG. 5.
Figure 8:
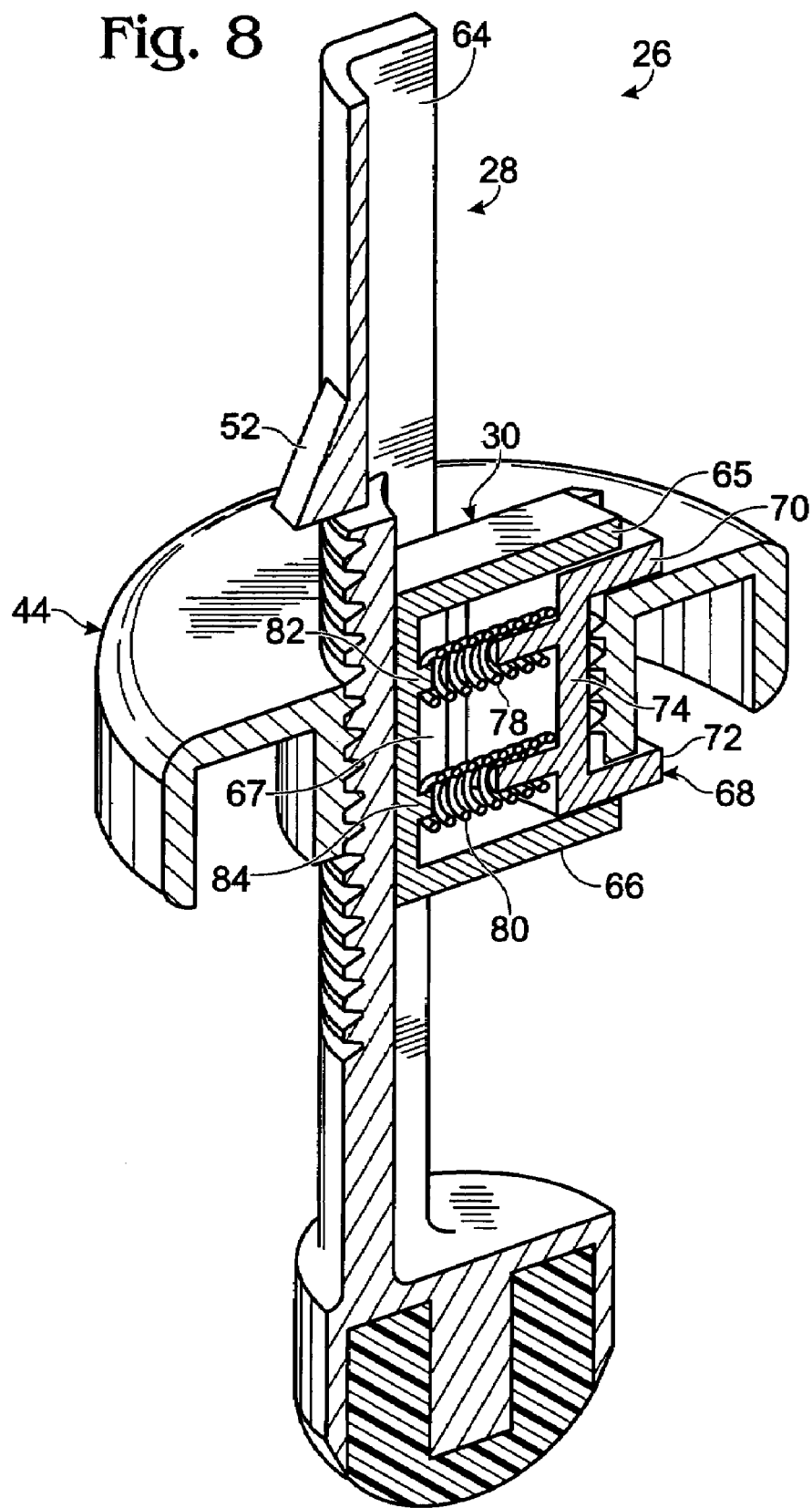
FIG. 8 is a cross-sectional view of the position adjuster of FIG. 5, along line 8-8 of FIG. 5.

Any suitable disengagement structure 61 may be used in course adjustment mechanism 60. An exemplary disengagement structure is illustrated in FIGS. 5-8. The exemplary structure provides an integrated structure which includes both a fine adjustment mechanism and a course adjustment mechanism. Briefly, in the figures, FIG. 5 illustrates a position adjuster attached to the housing of a projection device. The position adjuster is shown in an engaged position with the adjustment rod threads 42 engaged with the internal dial threads 46. FIG. 6 is an exploded view of the embodiment of FIG. 5. FIG. 7 and FIG. 8 are cross-sectional views of the embodiment of FIG. 5 along line 7-7 and 8-8 of FIG. 5.

As shown in FIGS. 5-8, adjustment rod 28 may be u-shaped such that a space or channel 64 is defined by adjustment rod 28. Although shown as a u-shape, it should be appreciated that adjustment rod 28 may be any suitable shape. Extending from adjustment rod 28 into channel 64 is attachment structure 30, which may be fixed to or integrated within the housing of the projection device.

As described above, attachment structure 30 may include a first extension plate 65, a second extension plate 66 and a rib 67 connecting the first extension plate and second extension plate. Rib 67 may be configured to abut internal region/channel 64 of adjustment rod 28 as defined by the u-shape of adjustment rod 28. As adjustment rod 28 is moved vertically, rib 67 may slidingly engage the adjustment rod 28. The first and second extension plates may be spaced such that adjustment dial 44 and bridge 68 (described in more detail below) may be disposed between the extension plates.

Although shown as two extension plates, attachment structure may have a single extension plate. Further, in some embodiments, one or more of the extension plates may be molded or otherwise integrated into the housing of the projection device.

Adjacent adjustment dial 44 may be a bridge 68 including a first lip 70 and a second lip 72 connected through a span 74. Span 74 may correspond to the general shape of internal surface 76 of adjustment dial 44. Typically, span 74 may include a substantially non-interrupted surface which is adapted to slide against (without locking or engaging) threads 46 of adjustment dial 44. Thus, a portion of span 74 may be configured to abut against internal surface 76 and enable adjustment dial 44 to rotate between first lip 70 and second lip 72.

First lip 70 and second lip 72 may each include a groove or other similar structure to receive first extension plate 65 and second extension plate 66, respectively. The grooves may enable the first and second extension plates to slide along a directed path during operation of the course adjustment mechanism. In some embodiments, there may be a single extension plate and single lip.

Coupled to span 74 is a biasing mechanism, such as springs 78, 80. Springs 78, 80 may extend from span 74, and into channel 64 defined by adjustment rod 28. The springs may be configured to engage rib 67 of attachment structure 30, as indicated at 82, 84 (indicated in FIG. 8).

Springs 78, 80 bias bridge 68 against the internal surface of adjustment dial 44. Springs 78, 80, further abut against rib 67 of attachment structure 30. The springs apply pressure against bridge 68 which results in adjustment rod 28 engaging the internal threads of the adjustment dial. The pressure on adjustment rod 28 from the biasing mechanism against rib 67 results in adjustment rod 28 abutting against the opposing internal surface of attachment dial 44 such that adjustment rod 28 engages a first portion of internal surface 76 and bridge 68 engages the opposite portion of adjacent internal surface 76. This configuration may be considered a locked position.

Although illustrated as coil springs, any suitable biasing mechanism may be used. For example, resilient material, such as foam or the like, may be used as the biasing mechanism. Moreover, although illustrated using two springs, any number of springs or biasing mechanisms may be used. For example, in some embodiments, a single spring may be used to bias bridge 68 and adjustment rod 28 against internal surface 76.

In operation, a user may apply a force to release the adjustment dial from the adjustment rod. For example, a user may apply a lateral force to the adjustment dial which may result in compression (or loading) of the biasing mechanism such that adjustment dial 44 is disengaged from the threaded portion of the adjustment rod 28. In this manner, a user may compress the springs of the disengagement structure, thus loading the springs and disengaging/releasing the threads of the adjustment rod from the adjustment dial. Disengagement may result in a space 62 (best seen in FIG. 4) forming between adjustment rod 28 and adjustment dial 44. Although described in relation to release of the adjustment dial from the adjustment rod, it should be appreciated that in some embodiments, a user may apply a force to the adjustment rod to release the adjustment rod from the adjustment dial.

With compression of springs 78, 80, first and second lip 70, 72 are displaced such that at least a portion of first and second extension plate 65, 66 are accepted within the grooves of the lips. In the illustrated embodiment, the first and second lip may travel as pressure is applied to the adjustment dial such that the first and second lip fully accept the first extension plate and second extension plate. For example, in FIG. 4, the biasing mechanism has been compressed, such that space 62 is generated. First lip 70 has been displaced such that extension plate 65 is fully received within first lip 70. A similar motion may be observed in regards to the second extension plate and second lip.

Upon disengagement from adjustment dial 44, adjustment rod 28 may be easily and quickly slid (vertically adjusted) to a selected position, such that a select portion aligns with adjustment dial 44. It should be noted that in the illustrated embodiments, the lateral position of rod 28 may be maintained via structure, e.g. housing of the device, without obstructing the vertical motion of rod 28. Although not required, rib 67 may substantially correspond to the u-shape of the adjustment rod preventing rotation of the adjustment rod.

Movement of adjustment rod 28 vertically relative to adjustment dial 44 results in vertical movement of projection device 10. Typically, during disengagement, substantially little or no contact is made between the threaded region of adjustment dial 44 and the threaded portion of adjustment rod 28 such that the threads do not prevent the user from positioning the rod in a select position.

Upon positioning of the adjustment rod 28 in a select position, release of the biasing mechanism causes the adjustment dial to once again engage the adjustment rod. Thus, upon release internal threads 46 of adjustment dial 44 match with threads 42 of adjustment rod 28 locking the adjustment dial in place. Release of the biasing mechanism, results in the configuration shown in FIGS. 3 and 5.

Once the coarse adjustment is made, fine adjustments may be made by rotating the adjustment dial so that it travels along the threads of the adjustment rod. Thus, the adjustment dial may be used to adjust the position of the device via two different mechanisms: via rotation about the adjustment rod and via a collapsing mechanism that enables sliding motion of the adjustment rod within the dial. By using the combination coarse adjustment mechanism and fine adjustment mechanism, a user may easily and quickly position an image in a desired vertical position on a viewing surface.

The cross-sections shown in FIGS. 7 and 8 may be used to further illustrate the combination fine and course adjustment mechanism for the position adjuster described above. As described above, position adjuster 26 includes an adjustment rod 28 and an adjustment dial 44. In this exemplary embodiment, adjustment dial 44 is ring shaped with an internal opening. Adjustment rod 28 is received within the internal opening of adjustment dial 44. Further received within the internal opening is bridge 68 and attachment structure 30.

In a first position (shown in FIG. 7), adjustment rod 28 engages adjustment dial 44. Specifically, threaded portion 40 of adjustment rod engages threaded region 45 of adjustment dial 44. This position is maintained by the biasing mechanism (e.g. springs 78, 80) which extend between span 74 of bridge 68 and rib 67 of attachment structure 30. In this position, rotation of adjustment dial 44 about adjustment rod 28 enables fine adjustment of the position of the rod within the position adjuster, thus enabling fine adjustment of the vertical angle of the device relative a support surface.

In a second position, springs 78 and 80 may be compressed. Compression of springs 78, 80 result in adjustment dial 44 being displaced from adjustment rod 28 such that space 62 (shown best in FIG. 4) is formed. Adjustment rod 28 may then be vertically moved relative adjustment dial 44. Substantially little or no contact is made between adjustment rod 28 and adjustment dial 44 during operation of the course adjustment mechanism.

Upon release of pressure against springs 78 and 80, adjustment dial 44 is biased back into the first position whereby the adjustment dial engages the adjustment rod. The threads of the adjustment rod and adjustment dial may operate to lock the rod in place relative the adjustment dial.

Although position adjuster 26 is described in regards to lifting a projection device from a reference surface, it should be appreciated that position adjuster 26 may be used to displace a device supported from other suitable surfaces. For example, the above disclosed position adjuster may be used to selectively position a wall-mounted projection device a select angle from the wall or other vertical or substantially vertical surface. Alternatively, the position adjuster may be used in a ceiling mounted or overhead mount. For example, the position adjuster may adjustably couple a projection device to an overhead mounting bracket.

Referring back to FIG. 2, in some embodiments, a pair of position adjusters may be used. In such embodiments, adjustment of one of the position adjusters relative to the other position adjuster may enable correction and adjustment of side-to-side tilt of the image. As an example, and not as a limitation, a user may use the coarse adjustment mechanism described above to selectively position the vertical height of the image. By matching the two position adjusters to substantially similar positions, the vertical height of the image may be controlled. The user may then opt to use the fine adjustment of one or both of the position adjusters to correct for any tilt of the image which may result from an uneven support surface or the like.

Although the present exemplary embodiments illustrate the use of a position adjuster in a projection device, it should be appreciated that the position adjuster may be used in any suitable device that may be selectively positioned at a variety of angles relative to a support surface. For example, the position adjuster may be used in electronic devices, such as televisions, display monitors, radios, speakers, etc.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring, nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A position adjuster for adjusting a device at a select angle from a reference surface; the position adjuster comprising:
   an adjustment rod;
   an adjustment dial operatively attached to the device and configured to engage the adjustment rod for fine adjustment of the device, the adjustment dial further configured to selectively disengage from the adjustment rod to enable coarse adjustment of the device; and a foot including a substantially rounded contact region coupled to the adjustment rod wherein the contact region is configured to engage a reference surface;

wherein the adjustment dial includes a gripable outer circumference and a threaded inner circumference having a single, substantially continuous thread, the adjustment rod includes a threaded outer surface, and the threaded inner circumference of the adjustment dial engages the threaded surface of the adjustment rod during fine adjustment and disengages from the threaded surface of the adjustment rod to enable coarse adjustment.

2. The position adjuster of claim 1, wherein the adjustment rod has a threaded portion configured to engage a threaded region of the adjustment dial.

3. The position adjuster of claim 1, wherein the adjustment dial is configured to be selectively rotated about the adjustment rod.

4. The position adjuster of claim 3, wherein the adjustment rod is configured to travel vertically relative the adjustment dial.

5. The position adjuster of claim 1, further comprising a coarse adjustment mechanism configured to enable disengagement of the adjustment dial from the adjustment rod.

6. The position adjuster of claim 5, wherein the coarse adjustment mechanism includes a biasing mechanism configured to bias the adjustment dial against the adjustment rod.

7. The position adjuster of claim 5, wherein the coarse adjustment mechanism includes a bridge adjacent the adjustment dial configured to slidingly retain an attachment structure coupled to the device.

8. The position adjuster of claim 6, wherein the coarse adjustment mechanism is configured to receive farce applied against the biasing mechanism to disengage the adjustment dial from the adjustment rod.

9. The position adjuster of claim 5, wherein the coarse adjustment mechanism is configured to enable the adjustment rod to be vertically slid to a select position relative the adjustment dial.

10. The position adjuster of claim 1, further comprising a fine adjustment mechanism configured to enable fine adjustment of the position of the adjustment dial relative the adjustment rod.

11. The position adjuster of claim 10, wherein the fine adjustment mechanism includes threads on the adjustment dial which substantially correspond to threads on the adjustment rod.

12. The position adjuster of claim 11, wherein the adjustment dial is configured to be selectively rotated to finely position the adjustment dial relative the adjustment rod.

13. The position adjuster of claim 1 for use in a projection device.

14. A position adjuster for adjusting a projection device, the position adjuster comprising:

an adjustment dial including a gripable outer circumference and a threaded inner circumference;

an adjustment rod including a threaded outer surface; and a foot including a substantially rounded contact region coupled to the adjustment rod, wherein the contact region engages a reference surface;

wherein the threaded inner circumference of the adjustment dial engages the threaded surface of the adjustment rod during fine adjustment and disengages from the threaded surface of the adjustment rod to enable coarse adjustment.

15. The position adjuster of claim 14, further comprising:
an adjustment rod; and
an adjustment dial rotatable about the adjustment rod and operatively coupled to the projection device,
where the coarse adjustment mechanism is configured to enable disengagement of the adjustment dial from the adjustment rod.

16. The position adjuster of claim 14, further comprising:
an adjustment rod; and
an adjustment dial rotatable about the adjustment rod and operatively coupled to the projection device,
wherein course adjustment mechanism includes a biasing mechanism configured to bias the adjustment dial against the adjustment rod.

17. The position adjuster of claim 16, wherein the coarse adjustment mechanism is configured to receive force applied against the biasing mechanism to disengage the adjustment dial from the adjustment rod.

18. The position adjuster of claim 14, further comprising:
an adjustment rod; and
an adjustment dial rotatable about the adjustment rod and operatively coupled to the projection device, where the adjustment dial is spaced from the adjustment rod during use of the coarse adjustment mechanism.

19. The position adjuster of claim 14, further comprising an adjustment rod; and
an adjustment dial rotatable about the adjustment rod and operatively coupled to the projection device,
where the adjustment rod includes a threaded portion upon which the adjustment dial is configured to rotate.

20. The position adjuster of claim 14, further comprising:
an adjustment rod; and
an adjustment dial rotatable about the adjustment rod and operatively coupled to the projection device,
where the adjustment rod includes at least one stop to prevent release of the adjustment rod.

21. The position adjuster of claim 14, where the fine adjustment mechanism is operable in a first configuration and the coarse adjustment mechanism is operable in a second configuration.

22. The position adjuster of claim 14, wherein the fine adjustment mechanism includes a threaded region on an adjustment dial which substantially corresponds to a threaded portion on an adjustment rod.

23. The position adjuster of claim 1, wherein the adjustment dial is ring shaped, and wherein the adjustment rod extends through an interior of the ring-shaped adjustment dial.

24. The position adjuster of claim 1, wherein the adjustment rod and the adjustment dial include complementarily configured fine adjustment threads selectively engaged with each other to provide fine adjustment and selectively disengaged from each other to provide coarse adjustment.

25. A position adjuster for adjusting a device at a select angle from a reference surface, comprising:
an adjustment rod; and
an adjustment dial having at least a fine-adjustment position and a coarse-adjustment position; the adjustment dial operatively engaging the adjustment rod for fine-adjustment when in the fine-adjustment position and the adjustment dial disengaging the adjustment rod for coarse-adjustment when in the coarse-adjustment position;

wherein the coarse adjustment mechanism includes a disengagement structure, wherein the disengagement structure automatically collapses upon excessive force;

wherein the adjustment dial includes a gripable outer circumference and a threaded inner circumference, the adjustment rod includes a threaded outer surface, and the threaded inner circumference of the adjustment dial engages the threaded surface of the adjustment rod during fine adjustment and disengages from the threaded surface of the adjustment rod to enable coarse adjustment.

26. The position adjuster of claim 1, wherein the adjustment dial is further configured to automatically reengage the adjustment rod after course adjustment of the device.

* * * * *